United States Patent [19]

Thomson

[11] 4,427,132
[45] Jan. 24, 1984

[54] LIQUID STORAGE AND MEASUREMENT SYSTEM

[75] Inventor: John A. Thomson, Hampshire, England

[73] Assignee: Avery-Hardoll Limited, England

[21] Appl. No.: 302,651

[22] Filed: Sep. 15, 1981

[30] Foreign Application Priority Data

Sep. 18, 1980 [GB] United Kingdom ............... 8030153

[51] Int. Cl.³ .............................................. B67D 5/16
[52] U.S. Cl. ....................................... 222/23; 222/71; 73/290 V
[58] Field of Search ...................... 222/14, 15, 16, 21, 222/52, 63, 64, 65, 66, 71; 340/621; 73/290 V; 364/479

[56] References Cited

U.S. PATENT DOCUMENTS

| | | | |
|---|---|---|---|
| 2,666,326 | 12/1947 | Poole et al. | 73/149 |
| 3,603,149 | 9/1971 | McKnown | 73/290 V |
| 4,223,806 | 9/1980 | Buschmann | 222/23 |
| 4,229,798 | 10/1980 | Rosie et al. | 340/621 |
| 4,284,210 | 8/1981 | Horak | 222/23 X |
| 4,346,818 | 8/1982 | Bösmiller | 222/77 X |

*Primary Examiner*—Joseph J. Rolla
*Assistant Examiner*—Charles C. Compton
*Attorney, Agent, or Firm*—Leydig, Voit, Osann, Mayer and Holt

[57] ABSTRACT

A liquid storage and measurement system particularly applicable to the volumetric measurement of siquid hydrocarbon fuel and to the dispensing of the fuel via a fuel dispensing unit, includes a liquid measurement/storage vessel of known dimensions arranged to be partially filled with liquid, e.g. fuel, from a bulk liquid storage tank to provide a liquid/gas interface, a supply system for supplying liquid to the measurement/storage vessel, a discharge system for discharging liquid from the measurement/storage vessel, an ultrasonic transducer for, during continuous discharge of the liquid from the measurement/storage vessel, continually sensing and monitoring the level of the interface during each of a plurality of predetermined time intervals such as to produce an electrical signal indicative of the position of the interface during each predetermined time interval, a signal generating transducer arranged to produce an electrical signal indicative of a reference interface level during each time interval, comparators for comparing the reference and interface signals to provide an indication of the change in position of the interface during successive time intervals and a computing system for relating the known dimensions of the measurement/storage vessel to the sensed interface level to provide a volumetric indication of the liquid being continuously discharged at any instant from the measurement/storage vessel.

16 Claims, 6 Drawing Figures

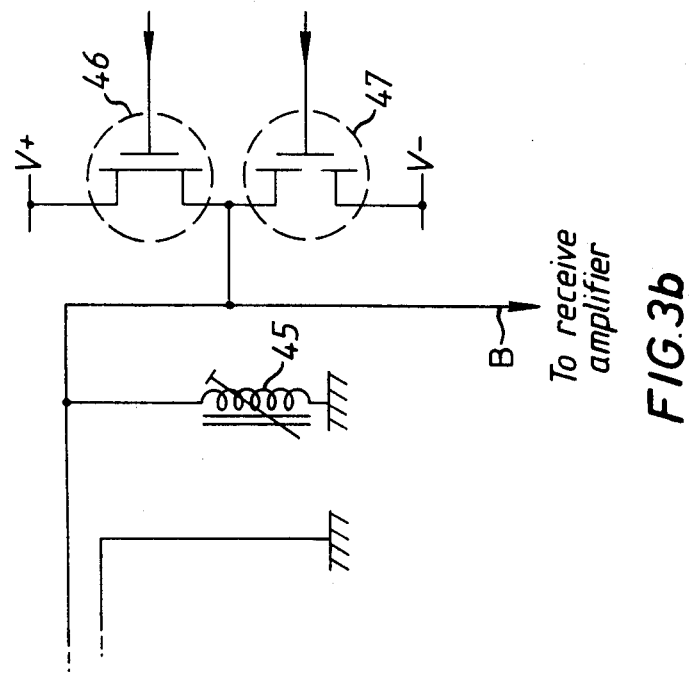
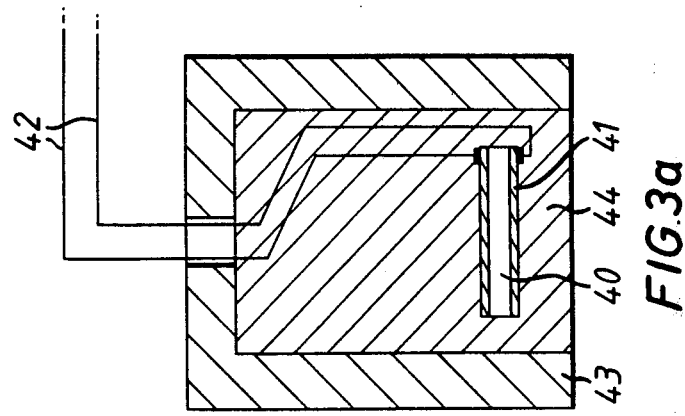
FIG.3b
FIG.3a

LIQUID STORAGE AND MEASUREMENT SYSTEM

DESCRIPTION

This invention relates to a liquid storage and measuring system and apparatus therefor and to a system for the volumetric measurement of liquid in a storage device and the dispensing of liquid therefrom. The invention has particular application to the volumetric measurement of liquid hydrocarbon fuel and the dispensing of the fuel via a fuel dispensing unit.

An object of the present invention is to provide apparatus for accurately determining the volume of liquid being dispensed from a storage vessel during discharge therefrom by constantly sampling the level of the liquid in the vessel.

A particular object of the invention is to provide apparatus for accurately determining the volume of liquid hydrocarbon fuel being dispensed from a measurement and storage vessel, by constantly and continually monitoring the change in level of the fuel in the vessel during discharge therefrom.

According to one aspect of the invention there is provided a liquid storage and measurement system including a bulk liquid storage means, at least one liquid measurement vessel of known dimensions capable of receiving a relatively much smaller volume of liquid than that stored in the bulk storage means and arranged to be partially filled with liquid to provide a liquid/gas interface, means for supplying liquid from the bulk storage means to the measurement vessel, means for discharging liquid from the measurement vessel; transducer means for, during discharge of the liquid from the measurement vessel, continually sensing and monitoring the level of the interface during each of a plurality of predetermined time intervals such as to produce an electrical signal indicative of the position of the interface during each predetermined time interval, signal generating means arranged to produce an electrical signal indicative of a reference interface level during each said time interval, measuring means responsive to the reference and interface signals to provide an indication of the change in position of the interface during successive time intervals and control means for applying data derived from said signals to an algorithm related to the known dimensions of the measurement vessel and the change in the interface level to provide a volumetric indication of the liquid being continuously discharged at any instant from the measurement vessel.

According to another aspect of the invention there is provided a fuel storage, measurement and dispensing system including a bulk liquid fuel storage means, at least one measurement/storage vessel of known dimensions located intermediate the bulk storage means and a fuel dispensing unit, for storing a relatively much smaller volume of fuel than that stored in said bulk storage means, means for partially filling the measurement/storage vessel from said bulk storage means to provide a fuel/gas interface therein, means for discharging fuel from the measurement/storage vessel to the fuel dispensing unit, transducer means for, during continuous discharge of the fuel, sensing and monitoring the position of the interface during each of a plurality of successive predetermined time intervals such as to produce an electrical signal indicative of the interface position during each said time interval, signal generating means to provide a signal indicative of a reference interface level during each said time interval, measuring means responsive to the reference level signals and the interface level signals during each said time interval to provide an indication of the change in position of the interface during successive predetermined time periods and control means for applying data derived from said signals to an algorithm related to the known dimensions of the measurement/storage vessel and the change of the interface level to provide a volumetric indication of the fuel being discharged from the measurement/storage vessel during each instant fuel is being continuously discharged therefrom.

According to yet another aspect of the invention there is provied a liquid storage and measurement system including at least one liquid measurement/storage vessel of known dimensions arranged to be partially filled with liquid to an upper level to provide a liquid/gas interface, means for supplying liquid to said upper level, means for discharging liquid from the said at least one measurement/storage vessel, a measurement transducer associated with the or each measurement/storage vessel and arranged during continuous discharge of the liquid from the measurement/storage vessel, to transmit electrical pulses through the liquid in the said at least one measurement/storage vessel and to receive pulses reflected from the interface, during each of a plurality of predetermined time periods in order to produce electrical output signals indicative of the position of the interface during any said predetermined time period, a reference transducer arranged to transmit pulses through the same medium as the measurement transducer to a target positioned a precise known distance from the reference transducer which receives pulses reflected from said target, measuring means responsive to signals received from said measurement and reference transducers to provide an indication of the change in position of the interface in the said at least one measurement/storage vessel during continuous discharge of liquid therefrom and during successive said predetermined time periods and control means for applying data derived from said signals to an algorithm related to the known dimensions of the measurement/storage vessel and the change in position of the interface to provide a volumetric indication of the liquid continuously discharged from the measurement/storage vessel during each said predetermined time period.

In a preferred embodiment of the invention applicable to the storage, volumetric measurement and dispensing of a liquid hydrocarbon fuel, a measurement vessel of known dimensions is partially filled with fuel such that a liquid/gas interface is formed between an upper level of the fuel in the vessel and the gas e.g. air, inert gas, e.g. nitrogen, above the upper level. Sensing means are provided to continually detect the position of the liquid/gas interface of the fuel from the measurement vessel to a dispensing unit, the sensing means detecting and monitoring continually the constantly changing position of the liquid/gas interface and relating the change in position to the original position of the interface prior to the commencement of the discharge of the fuel. By utilising an algorithm to relate the known geometric proportions of the vessel to the liquid/gas interface, a volumetric relationship for the fuel discharged can be continuously generated. A value of the total volume of the fuel discharged from the measurement vessel can also be obtained on termination of the discharge.

The sensing means in one embodiment of the invention described by way of example only, consists of an ultrasonic transceiver located at or adjacent to the base of the measurement vessel either internally or externally of the vessel such that pulses of ultrasonic frequency can be directed via the liquid in the vessel to the liquid/gas interface located towards the upper part of the vessel. Pulses of ultrasonic frequency transmitted by the transceiver are reflected back from the liquid/gas interface and received by the ultrasonic transceiver. The time of propagation of a pulse to the interface and back to the receiver is used as a measure of the distance travelled by the pulse. A second ultrasonic transceiver is used to establish the speed of sound in the fuel, the second transceiver acting as a reference transducer by sending pulses to a target positioned a precisely known distance from the transceiver.

The transit time for a pulse of ultrasonic frequency to travel the known distance is used to continuously calibrate the pulse transceiver directing pulses towards the liquid/gas interface. Thus by measuring that known distance transit time and relating it to the distance obtained from the pulse transit time associated with the detection of the position of the liquid/gas interface, an accurate and continuous sampling and monitoring of any change in the position of the liquid/gas interface is achieved during discharge of the fuel from the measurement vessel. Because the interface is continuously supplied with pulses, the average value of the echoes from the interface can be used to compensate for surface ripples and turbulence.

The invention will now be described by way of example only with particular reference to the accompanying drawings wherein FIG. 1 is a block schematic diagram of the liquid measuring and dispensing system and apparatus of the present invention applicable by way of example to the measurement and dispensing of liquid hydrocarbon fuel from a storage vessel to a fuel dispensing station;

FIG. 3a is a diagrammatic view of an ultrasonic transducer for use in the system of FIG. 1;

FIG. 3b is a circuit diagram of an excitation circuit for the transducer of FIG. 3a;

Figure 1:
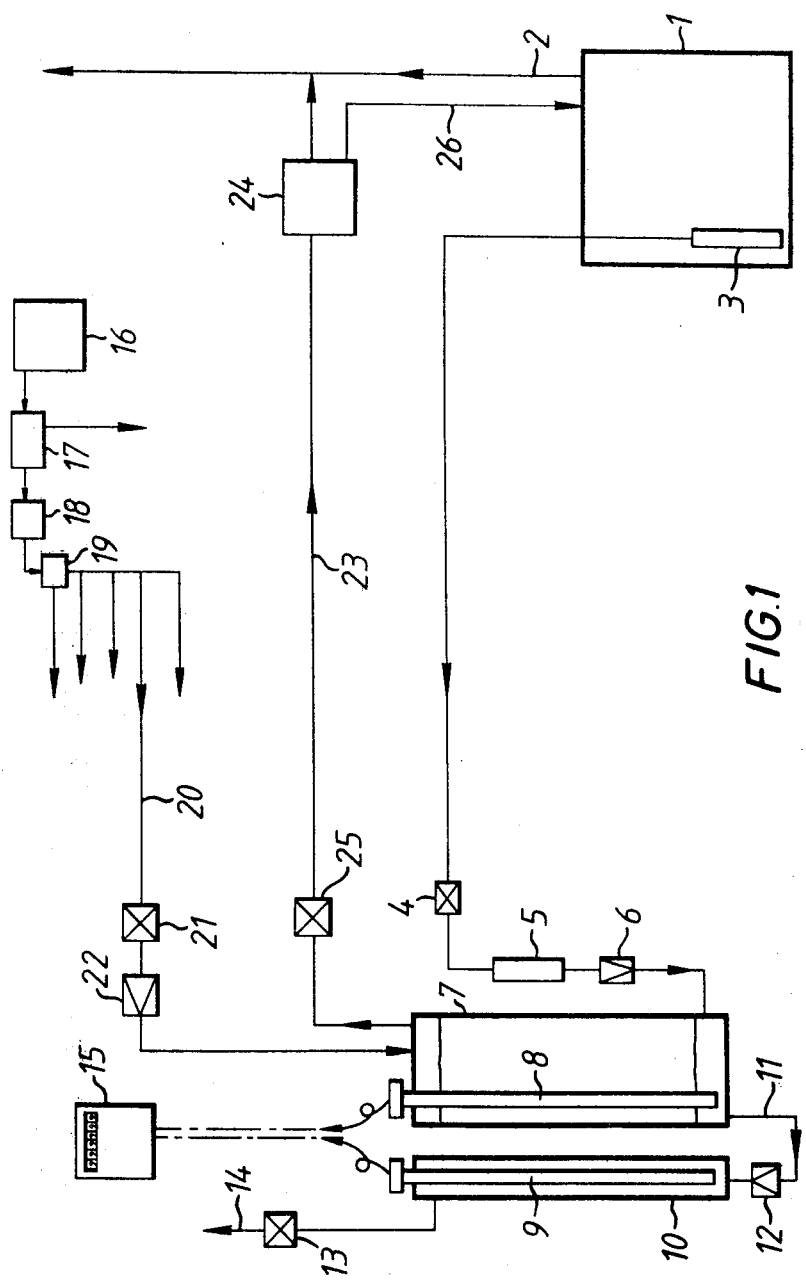

Referring initially to FIG. 1, fuel in bulk is stored in the underground fuel storage tank 1 which is provided with a main vent line 2 to atmosphere. A pump 3 submersed in the fuel tank 1 supplies liquid hydrocarbon fuel via a first solenoid-operated valve 4, filter 5 and check valve 6 to an inlet adjacent the base of an auxiliary measurement and storage vessel 7 which is also located underground. The vessel 7 may be of any suitable shape and dimensions provided the dimensions can be accurately determined. An ultrasonic transceiver 8 is immersed in the vessel 7 towards the base thereof. The vessel 7 is supplied with fuel from the bulk storage tank 1 up to an upper level thereby providing a liquid/gas interface in the vessel 7. A lower fuel level which may be a random or nominal value, is also provided adajcent the base of the vessel 7. A reference transducer 9 consisting of an ultrasonic transceiver, an associated target reflector and an associated memory device, is located so that its transceiver and target reflector are immersed completely in the fuel either within a separate reference vessel 10 which receives fuel from the vessel 7 via line 11 connected from the base of vessel 7 to the base of the reference vessel 10 via check valve 12, or is positioned within the measurement vessel 7. The target reflector is located below, but as close as is practicably possible to, the upper fuel level so that the distance between the ultrasonic transceiver and the target reflector is maximised.

Fuel is discharged from the vessel 7 either via reference vessel 10 and through solenoid-actuated valve 13 or directly therethrough and is supplied to a fuel nozzle dispensing device (not shown) via discharge line 14. A control unit for the ultrasonic transceivers 8, 9, is shown at 15 and will be described in more detail below.

The fuel is discharged from the vessel 7 and thence from the reference vessel 10 by means of air at a relatively low pressure. A relatively high pressure source 16 supplies air at high pressure, e.g., a nominal 100 p.s.i.g. via an air drier 17, air pressure regulator 18 and safety valve 19, to a low pressure air line 20, the air pressure regulator 18 having reduced the air pressure to a nominal 10 p.s.i.g. The low pressure air is supplied to the top of the storage vessel 7 via a further solenoid valve 21 and check valve 22. A vent line 23 is provided at the top of vessel 7 to allow air and fuel-containing gases to pass to a condenser 24 via a further solenoid-actuated valve 25. Expansion of the gas occurs as the gas passes through a nozzle into the condenser 24 which may be refrigerated and the air/fuel gas mixture impinges on baffles of the condenser 24 and is cooled, the air escaping to atmosphere via vent line 2 and any condensed fuel-containing liquid being returned to the bulk storage tank 1 via line 26.

Reverting to the ultrasonic measurement and reference transceivers 8, 9, the measurement transceiver is arranged during a fuel discharge cycle to transmit pulses of ultrasonic frequency towards the liquid/gas interface via the fuel, where they are reflected back towards the transceiver 8 which now acts as a pulse receiver. The transit time for a pulse of ultrasonic frequency to travel from the probe 8, through the fuel to the liquid/gas interface and back through the fuel to the receiver can be used as a measure of distance to provide an indication of the position of the liquid/gas interface, provided means are available to accurately assess the speed of sound in the fuel. This is achieved for each cycle of fuel discharge, from the vessel 7 by operation of the transceiver of the reference transducer 10 before that fuel discharge cycle begins. As previously indicated the ultrasonic transceiver of the reference transducer 9 is immersed in the fuel in the reference vessel 10 and spaced a precise known distance from the target reflector when the vessels 7 and 10 are charged with fuel for delivery and prior to the beginning of a fuel discharge cycle. The transit time for a pulse of ultrasonic frequency to travel the known distance, is stored in the associated memory device of the transducer 9. That stored known distance transit time data is then used to continuously calibrate the measurement probe 8 throughout the next fuel discharge cycle. Thus by relating the stored known distance transit time data to the distance obtained from the transit time associated with the measurement transceiver 8, an accurate and precise means is provided for measuring any change in the position of the liquid/gas interface. The change in the position of the interface detected at any instant during the discharge cycle is related to the original position of the interface before discharge commenced and by using an algorithm to relate the volumetric properties of the vessel to the liquid/gas interface, a continuous volumetric measurement of the fuel being discharged at any instant during the discharge cycle, is effected.

It will be appreciated that the auxiliary measurement/storage vessel 7 may be of any convenient shape such as a cylinder, sphere, cone or truncated cone provided that the internal dimensions of the vessel can be accurately determined.

The sequence of operations necessary to discharge a quantity of fuel from discharge line 14 will now be described.

The nozzle or hose cock at the fuel dispensing station is removed from its mounting and solenoid-actuated valve 4 is isolated. Solenoid-actuated valve 25 in the vent line 23 is closed and valve 21 in the low pressure air supply line is opened. In practice, a time delay would be interduced before the opening of valve 13 to allow the electronic control circuits and components to be stablised and to ensure that no leakage exists from the auxiliary and/or reference vessels 7, 10 respectively; any leakage being detected by a change in level after pressurisation and before opening the solenoid-actuated valves.

Discharge valve 13 then opens to discharge fuel via line 14 in accordance with the computation data available at the fuel dispensing station or in accordance with pre-set electronic data.

When the required quantity has been dispensed or when an indication is provided that the total quantity of fuel within the storage measurement vessel 7 has been exhausted, either the hose cock at the dispensing station is replaced to terminate delivery or the sensing of the lower level of fuel in vessel 7 by the level detector automatically closes valve 13 in the fuel discharge line 14. Valve 21 in the low pressure air supply line 20 is also closed and valve 25 in the vent line 23 opens to allow any gas to escape from the vessel 7 to the condenser 24. Valve 4 then opens to allow fuel from the bulk storage tank 1 to flow into the vessel 7 up to an upper level which is a random level having a nominal value only. When this level is reached, the transceiver 8 effects isolation of valve 4 by sensing the upper level of the fuel in the vessel 7. When not in use, valve 25 remains open to allow gas to be passed to the condenser 24 and closure of valve 13 prevents any discharge of fuel from the measurement and reference vessels 7, 10.

It will be appreciated that any incremental quantity of fuel may be discharged from the vessel 7 or the whole of the contents, e.g. a nominal 20 gallons may be discharged. Furthermore, since the use of air at low pressure has been described for the discharge of fuel, the valves may be pneumatically operable.

The control unit for the system of the present invention will now be described with reference to FIGS. 2 to 5.

Figure 2:
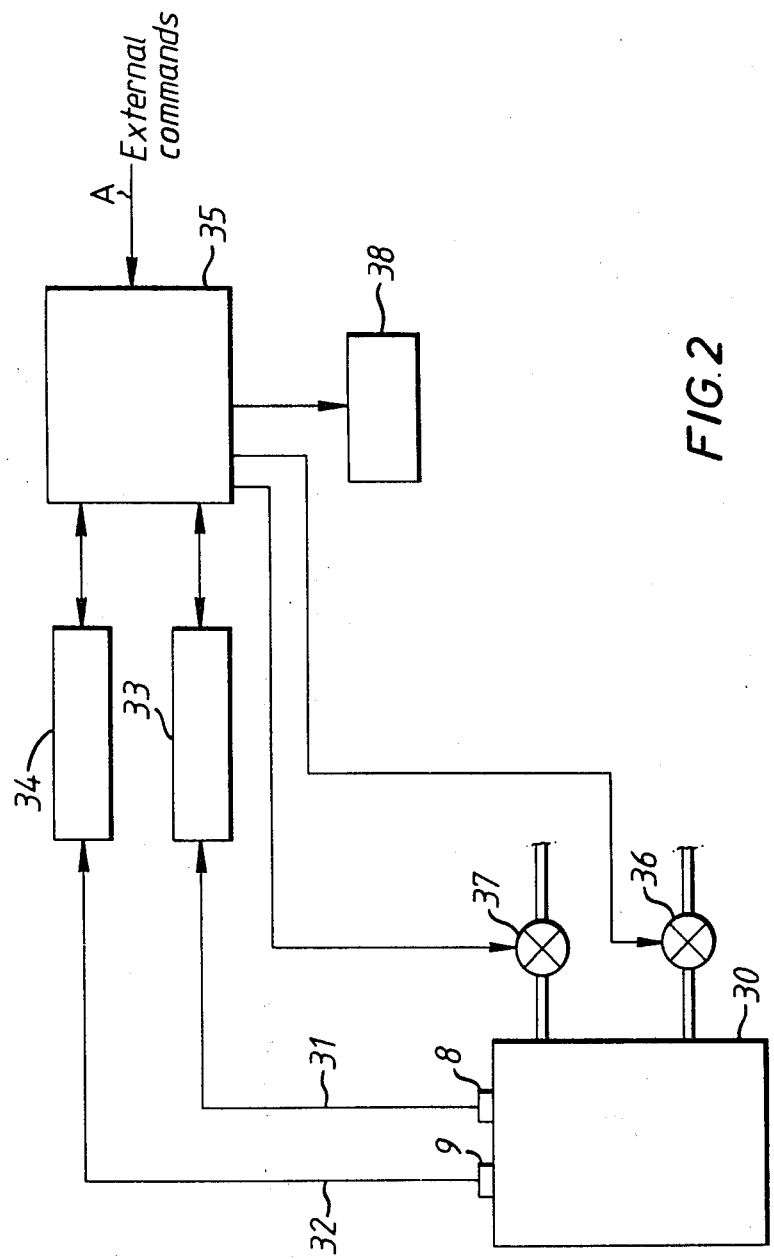
FIG. 2 is a block schematic diagram of a control unit for the system of FIG. 1.

Referring to FIG. 2, the measurement and reference vessels 7, 10 are represented diagrammatically by block 30 with signals from the measurement transceiver 8 and from the memory device of the reference transducer 9 respectively available on lines 31, 32 and supplied to respective pulse transit time measuring modules 33, 34. A controller 35 supplies and receives data signals to and from respectively the electronic pulse transit time measuring modules 33, 34 and controls the opening and closing of valves 36, 37 controlling the flow of fuel to and from the measuring vessel 7.

The controller 35 also continuously computes from data received from the modules 33, 34, the volume of fuel discharged from measuring vessel 7 during a fuel discharge operation, and where required, the cash value of the volume of fuel discharged. These computed values are displayed in display unit 38 and/or transmitted to any remote location for display or recording of said computed values.

The controller 35 is also capable of receiving external commands indicated by arrow A, to deliver a pre-set quantity of fuel either by volume or cash value, or any volume or cash value subject to either externally commanded limits or limits pre-set within the controller.

During a fuel discharge operation, the controller 35 receives from the pulse transit time measuring modules 33, 34, signals originating from the measuring transceiver 8 and the memory device of the reference transducer 9 respectively. In practice, a plurality of pulses are used to achieve greater precision of measurement with an average of n pulse transit periods being taken. Firstly, the controller 35 receives a signal indicative of the speed of propagation of a pulse generated by the ultrasonic transceiver of the reference transducer 9 passed through the fuel and stored in the associated memory device before the delivery cycle began. Secondly, the controller receives via a pulse transit time measuring module, a signal indicative of the time for a pulse to pass from the measurement transceiver 8 to the liquid/gas interface and back to the transceiver 8.

The controller 35 applies data derived from these signals, to an algorithm related to the volumetric geometry of the measuring vessel 7 and the rate of change of level at any point in the vessel 7 between the upper and lower levels, thereby producing a continuous indication of the volume of fuel discharged from vessel 7 at any instant. This algorithm may include average either the transit time information received from pulse transit time measuring modules, or values computed from the transit time information by any mathematical or statistical method.

Referring to FIG. 3a, a typical ultrasonic transducer capable of being used as a measurement or reference transceiver, comprises a ceramic disc 40 of specified dimensions coated with a layer 41 of silver on each face thereof. Connecting leads 42 are attached to each face and pass through the casing 43, the disc 40 and leads 42 being retained in the metal core by a resin 44.

The excitation circuit for the transducer of FIG. 3a is shown in FIG. 3b. A variable compensation inductor 45 is connected in parallel across the leads 42 of the transducer and is adjusted such that the electrical resonant frequency of the comparator and the transducer is equal to the mechanical resonant frequency of the transducer. Electrical stress is applied to one axis of the transducer by means of the transistor switches 46, 47. Transistor 46 is first switched to an 'ON' condition for a period corresponding to one half cycle of the resonant frequency of the transducer and is then switched to the 'OFF' condition for the same period. This causes the transducer to oscillate sinusoidally with a delay of from 5 to 10 cycles. The connection to the receive amplifier is shown by arrow B.

Figure 4:
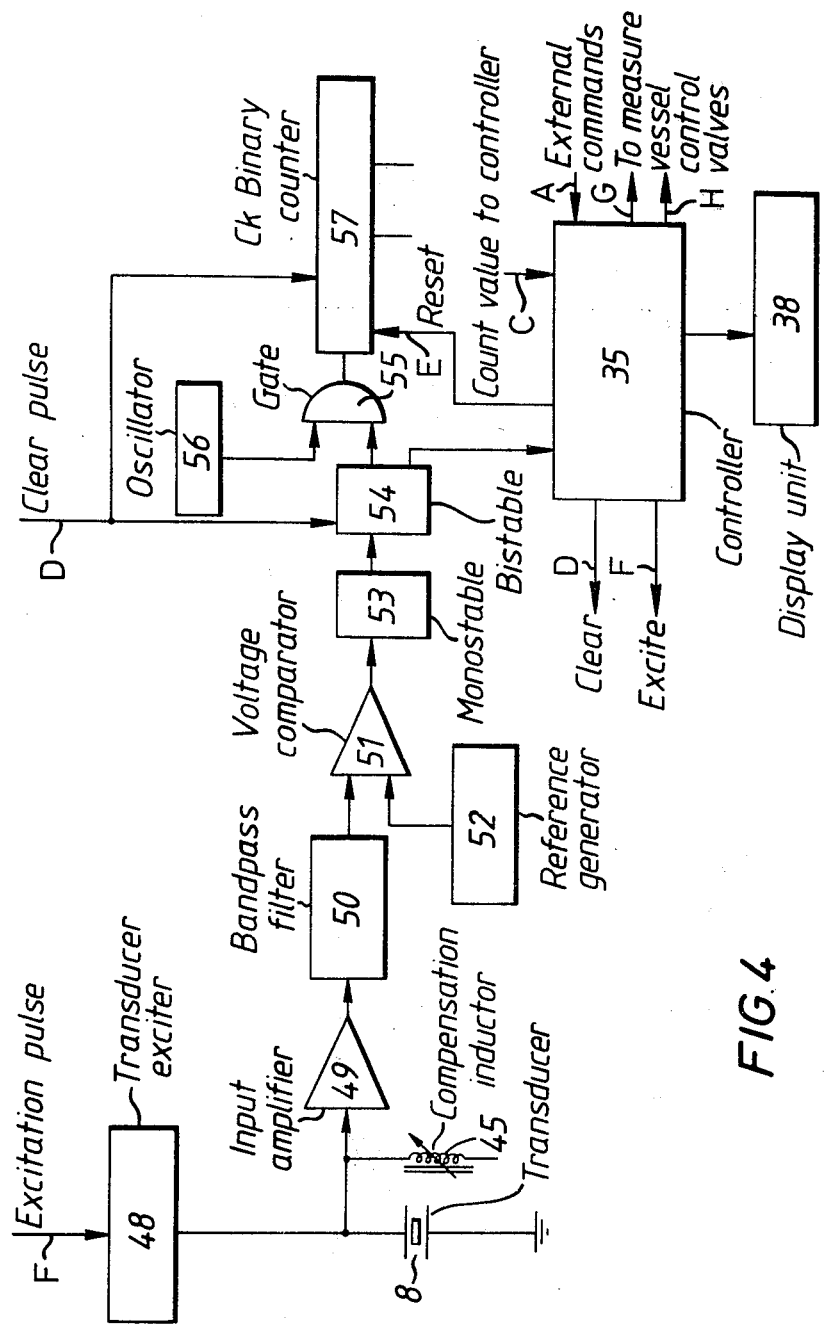
FIG. 4 is a block diagram of a pulse transit time measuring module used in the system of FIG. 1.
Figure 5:
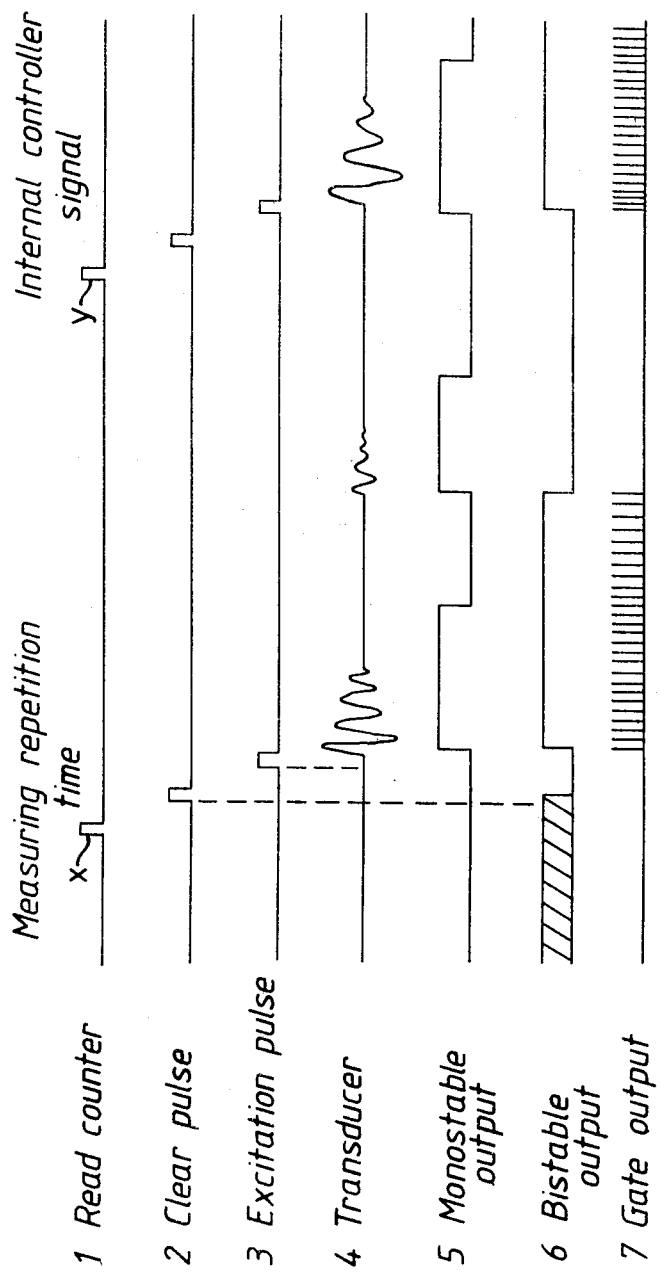
FIG. 5 is a representation of wave-forms of signals from the various stages of the module of FIG. 4.

Referring to FIGS. 4 and 5, a pulse transit time measuring module is described.

The module in one scheme may use separate transmitting and receiving transducers, or in another scheme a single transducer may be used as a transceiver.

In either scheme transducers may be duplicated for redundancy. Again, multiple transducer variations of the schemes may be implemented whereby measurements can be taken simultaneously or alternately using different transducers or arrays of transducers, thereby improving measuring accuracy or system reliability.

By way of example, a scheme employing a single transducer as a transceiver is used within the description of a typical pulse transit time measuring module. FIG. 4 is a block diagram of the pulse transit time measuring module and FIG. 5 is a diagram of wave-forms in the module. The controller 35 and display unit 38 do not form part of the module but are shown to more clearly indicate the relationship between the module and controller.

An excitation pulse for the transducer 8 is generated by the transducer excitation circuit (FIG. 3b) under the command of the controller 35. The repetition rate of the excitation pulses applied to the transducers may be fixed or varied at a rate determined by the controller 35 in accordance with such factors as the rate of change of fluid level in the measuring vessel 7 (FIG. 1), or by external command.

An internal controller signal (Y, FIG. 5) causes the contents of a binary counter 57 to be transferred into the controller 35 as indicated by arrow C in FIG. 4. The controller 35 then issues the clear pulse indicated by arrow D (See also line 2 FIG. 5) to the module which clears binary counter 57 and resets bistable 54. A reset pulse indicated by arrow E is applied to counter 57 from controller 35.

The controller then issues a pulse indicated by arrow F (See also line 3 FIG. 5) to the transducer exciter 48 which causes the application of electrical stress to the transducer and parallel compensation inductor 45, thereby causing the transducer 8 to oscillator sinusoidally with a decay of 5 to 10 cycles.

As previously indicated, the compensation inductor 45 is adjusted such that the electrical resonant frequency of the inductor 45 and transducer 8 is equal to the mechanical resonant frequency of the said transducer 8.

With excitation of the transducer from exciter 48, the excitation waveform (See line 4 FIG. 5) is detected by the input amplifier 49, where it is amplified and supplied to a bandpass filter 50.

The output of filter 50 is supplied to a voltage comparator 51 together with a reference voltage supplied from the reference generator 52. When the amplified and filtered signals from the measuring transceiver 8 exceed the threshold set by the reference generator 52, then the comparator output from comparator 51 changes and triggers monostable 53 to provide an output signal (line 5 FIG. 5) therefrom to change the state of clocked bistable 54 (FIG. 4) which supplies an output signal (line 6 FIG. 5) to one input of AND gate 55 to open the gate and allow the pulses generated by oscillator 56 to pass through the gate 55 to increment the count of binary counter 57 (See line 7 FIG. 5).

When a pulse transmitted from the measuring transceiver 8 is reflected back from the liquid/gas interface and received by the transceiver, monostable 53 is again triggered and the clocked bistable 54 again changes state to close gate 55. The count accumulated in binary counter 57 now represents the total transit time for a pulse to be transmitted by the measuring transceiver 8 via the fuel in vessel 7 to the liquid/gas interface, and to be reflected therefrom to be received back by the transceiver, plus a time between a 0 and 1 period of the oscillator 56. The controller now electronically reads the content of counter 57 and acts on the result by producing output signals indicated by arrows G, H, in FIG. 4, for controlling the discharge and/or for providing an indication of the volume of fuel dispensed as previously described.

| Sample Calculation using Algorithm |
|---|
| Let measuring vessel diameter = 300 mm |
| Let Pulse Transit Time measuring clock = 10 MHz |
| Let speed of propagation in fluid = 1400 m/s |
| Minimum resolvable time = 1/10 MHz = 100 ns |
| Distance travelled by pulse in |
| 100 ns @ 1400 m/s = $1400/10^7 = 1.4 \times 10^{-4}$ m |
| Minimum resolvable volume |
| $= 0.15 \times 0.15 \times \pi \times 1.4 \times 10^{-4}$ m$^3$ |
| $= 0.0989 \times 10^{-4}$ |
| Approximate to $0.1 \times 10^{-4}$ |
| $= 0.1 \times 10^{-1} \rho$ |
| $= 0.01 \rho$ |
| Hence Accuracy of System = True Value + (0→0.01$\rho$) |
| @ 1400 m/s propagation velocity |

Note
@ 1000 m/s propagation velocity result = True Value + (0→0.007$\rho$)

Although the measurement and dispensing of fuel has been particularly described, any liquid may be stored and discharged by the system of the present invention. Reference to liquid fuel is not limited to highly volatile fuels such as gasoline where underground storage facilities are required, but diesel and other fuels may be so discharged in which case, no underground storage or other facilities would be required for the bulk storage or auxiliary vessel.

Furthermore, the invention is not limited to a static system and is applicable to bulk delivery vehicles where quantities of liquids e.g. fuel are required to be dispensed.

Since the system is operated from an extremely low air pressure, in the event of an emergency such as an electrical power failure, the electronic control equipment could be operated from a low voltage source such as a battery and containers of compressed air could be substituted for the air supply to provide sufficient air pressure to discharge liquid from the bulk storage and from the storage vessel 7.

Although only a single storage/measurement vessel has been shown in the drawing for the particular embodiment described, a plurality of such vessels may be provided. For instance two vessels may be coupled in parallel with one vessel containing a different grade of fuel from that contained in the other vessel in order to produce at the fuel dispensing station a blend of fuels in accordance with a predetermined ratio of grades. Alternatively two such vessels may be supplied with the same type of liquid, e.g. fuel and operated alternately such that the liquid is discharged from one vessel whilst the other vessel is being refilled such that a continuous dispensing operation can be performed with quantities dispensed in excess of the capacity of any one vessel.

Although in the preferred embodiment described and illustrated, a measurement transducer and a reference transducer are included in the system, it will be appreciated that it is not necessary to include a reference transducer and a single transducer system may be employed including any type of sensor capable of detecting a change in level of the liquid in the storage vessel. In such an arrangement, the single transducer system would include a single ultrasonic transceiver, a related target reflector positioned as described above for the target reflector of the reference transducer 9, and an associated memory device for storing known distance transit time data generated before each delivery cycle for use during the delivery cycle.

Where the system employs a measurement and a reference transducer, it is not necessary for the reference transducer to be located externally of the vessel containing the measurement probe.

Furthermore, although discharge of the fuel from the storage vessel has been described with reference to air pressure, it will be appreciated that any means may be provided, such as a submersible pump or suction means to effect discharge of the fuel or other liquid from the vessel.

The system of the present invention is capable of delivering unspecified quantities of fuel to an order of precision in volumetric measurement terms which complies with the tolerances specified by the appropriate Weights and Measures Authority. The precision and accuracy of the system is limited only by the discrimination of the electronic time measuring apparatus associated with the measuring system, allowing resolution of time intervals of about 100 nanoseconds, although greater resolution may be provided if required. The apparatus provides a visual indication of the volume of fuel being continuously discharged from a storage vessel and the final random volume discharged upon termination of the discharge flow.

In a modification of the invention a single transceiver may be introduced intermediate the measuring transceiver and the liquid/gas interface such that the first pulse echo received provides the reference whilst the second pulse echo indicates the position of the interface.

A suitable radiation source such as a laser, unaffected by temperature or density effects may be located within the gas station of the storage vessel such that the liquid/gas interface may be sampled and detected from the gas section instead of the fluid section. In order to achieve a clear reflection of the light pulse directed at the interface, it may be necessary to provide a reflective float to more effectively delineate the liquid/gas interface.

Alternatively, a capacitance type measuring probe may be utilised to provide continuous monitoring of the liquid/gas interface position.

An important feature of the measuring storage vessel of the system of the present invention, is that it functions, inherently as a conventional gas separator; such a function being a pre-requisite of all measuring systems used for trade purposes. A further particularly beneficial feature of the measuring system of the present invention, which is possible because of the accuracy of the system, is the ability of the equipment to self check to ensure accuracy of measurement. For example, when the equipment is not in use, the last stable liquid/gas interface position can be stored in an electronic data storage device such that when the equipment is re-activated for use, the liquid/gas interface position can be sampled and compared with the position indicated by the stored data to provide an indication if any difference between the positions exists, whether or not leakage has occurred in the equipment of the system such as in the pipes, values or fittings thereof.

Furthermore, prior to a normal dispensing cycle, the air pressure having been increased to assist evacuation of the measuring storage vessel, a short time period, e.g. 2 to 5 seconds, may be used to establish whether or not any change in the liquid/gas interface position has occurred prior to the discharge valves being opened to permit dispensing of the fluid. Such an arrangement would provide a check for leakage of the inlet, check and control valves and also any leakage from the measurement storage vessel.

The system of the present invention, as previously indicated relies on a continuous sampling and monitoring of the liquid/gas interface position e.g. each position is sampled one hundred times, and an average measurement value obtained for the relative position of the interface. By the very nature of the measuring process, in practice, the initial flow rate may be limited as may the flow rate towards the termination of a delivery. In such circumstances, it is practical to increase the number of pulses used to derive a simple measurement value from say, 100 samples to 1000 samples thus allowing a more accurate value to be provided for the position of the liquid/gas interface within the measurement storage vessel. The electronic control unit can be arranged such that the frequency of sampling can be varied in accordance with the rate of change in position of the liquid/gas interface.

Because the measuring system of the invention is a precise positive displacement system, the value of fluid volume displaced referred to any preferred time base may be used to generate continuous, instantaneous rate of flow values for the fluid being discharged. Such a system has many applications in the measuring instrument field for providing accurate calibration of inherently 'flow rate' sensing measurement devices such as for instance turbine meters.

The position of the interface can be measured at any point in the storage vessel's vertical cross section.

A variation of the system can be used as a volumetric proving device for proving volumetric measuring devices by either the start-stop or flying start-stop process.

The system of the present invention can be developed to allow the volume measurement of fuel dispensed to be multiplied by a unit cash value to allow computation of a fuel sale price related to a particular retail transaction.

Various peripheral functions can be added to the external electronic controls to allow variable pre-set quantities of fluid, e.g. fuel, by volume or price to be dispensed.

The storage/measurement vessel of the system of the present invention may be a self contained vessel having all ancillary equipment such as transducers, check valves, control valves and filters incorporated within or around the vessel.

Where a multiplicity of measuring vessels are employed, with the same fluid combinations, a single reference target system may be used to establish the speed of sound through the fluid in one vessel, or within the main storage vessels.

Alternatively, although less accurate, the speed of sound in the fluid may be obtained by calculation from known values entered in the electronic conputing equipment of the system. Variations from the estimated value entered in the computing section may be derived, for example by measuring the temperature of the fluid and correcting the original estimated/known value to the actual value relative to the measured temperature.

It will be appreciated that the replacement of fluid in the measurement vessel after discharge, up to the original upper level, provides a check on the actual quantity of fluid discharged from the vessel.

A temperature sensing element such as a thermistor, may be located in the measuring vessel to correct the volume to a suitable reference temperature.

When a reference transducer and target reflector is used, since the reference device operates on a known distance, the known dimensional values for propagation of sound over the target distance may be utilised to determine whether one liquid or another is being discharged or dispensed. The system could be provided with interlocks to prevent the discharge of the wrong liquid, e.g. gasoline into a domestic heating system instead of kerosene. Thus, the reference device would be arranged to distinguish and discriminate between different liquids by virtue of the particular densities of different liquids and the consequent different transit times, and to shut down the system if for instance water was being dispensed instead of gasoline.

Although the reference transducer is described above as having an associated memory which stores known distance transit time data obtained before a fuel discharge cycle begins for use as a reference signal during that cycle, it is conceivable that such a reference transducer could be arranged to continuously monitor the known distance transit time during discharge and provide an instant, updated reference signal so that the associated memory store would not be needed, but care would have to be taken to avoid the target reflector ceasing to be immersed during a discharge cycle without it having to be located too close to the ultrasonic transceiver. With this problem in mind, the transducer may be provided with more than one target reflector and means for selecting the one which is most suitably located at any one instant.

I claim:

1. A liquid storage and measurement system including a bulk liquid storage means, at least one liquid measurement vessel of known dimensions capable of receiving a relatively much smaller volume of liquid than that stored in the bulk storage means and arranged to be partially filled with liquid to provide a liquid/gas interface, means for supplying liquid from the bulk storage means to the measurement vessel, means for discharging liquid from the measurement vessel, transducer means for, during discharge of the liquid from the measurement vessel, continually sensing and monitoring the level of the interface during each of a plurality of predetermined time intervals such as to produce an electrical signal indicative of the position of the interface during each predetermined time interval, signal generating means arranged to produce an electrical signal indicative of a reference interface level during each said time interval, measuring means responsive to the reference and interface signals to provide an indication of the change in position of the interface during successive time intervals and control means for applying data derived from said signals to an algorithm related to the known dimensions of the measurement vessel and the rate of change of level at any point in the measurement vessel to provide a volumetric indication of the liquid being continuously discharged at any instant from the measurement vessel.

2. The system defined in claim 1 in which said transducer means comprises a measuring transceiver arranged to transmit pulses through the liquid to the interface and to receive pulses reflected from the interface, the time of propagation of each pair of transmitted and reflected pulses providing a measure of the distance travelled by each pair of pulses through the liquid, said signal generating means comprising a reference transceiver arranged to transmit pulses through the same liquid and over a known distance to a target and to receive pulses reflected from the target, to provide a reference distance and transit time, and said measuring means being responsive to said electrical signals received from said measuring and reference transceivers to provide output signals indicative of the change in position of the interface in the measurement vessel during any of said predetermined time intervals.

3. The system defined in claim 1 further including two pulse transit time measuring modules connected respectively to said transducer means and to said signal generating means and arranged to receive output signals therefrom, each module being arranged to receive and supply signals from and to respectively said control means, and valve means responsive to output signals from said control means to control the flow of liquid to and from said measurement vessel.

4. The system defined in claim 3 wherein said control means is arranged to compute the volume of liquid discharged from the measurement/storage vessel during a liquid discharge operation in response to signals supplied thereto from said modules.

5. The system defined in claim 4 further including a visual display device arranged to receive signals indicative of volume of liquid being discharged from the measurement vessel, from said control means, to display the computed values of liquid volume discharged.

6. A liquid fuel storage, measurement and dispensing system including a bulk liquid fuel storage means, at least one measurement/storage vessel of known dimensions located intermediate the bulk storage means and a fuel dispensing unit, for storing a relatively much smaller volume of fuel than that stored in said bulk storage means, means for partially filling the measurement/storage vessel from said bulk storage means to provide a fuel/gas interface therein, means for discharging fuel from the measurement/storage vessel to the fuel dispensing unit, transducer means for, during continuous discharge of the fuel, sensing and monitoring the position of the interface during each of a plurality of successive predetermined time intervals such as to produce an electrical signal indicative of the interface position during each said time interval, signal generating means to provide a signal indicative of a reference interface level during each said time interval, measuring means responsive to the reference level signals and the interface level signals during each said time interval to provide an indication of the change in position of the interface during successive predetermined time periods and control means for applying data derived from said signals to an algorithm related to the known dimensions of the measurement/storage vessel and the rate of change of the interface level to provide a volumetric indication of the fuel being discharged from the measurement/storage vessel during each instant fuel is being continuously discharged therefrom.

7. The system defined in claim 6 in which said transducer means comprises a measuring transceiver arranged to transmit pulses through the fuel in said measurement/storage vessel, to the interface, and to receive pulses reflected from the interface, the time of propagation of each pair of transmitted and reflected pulses providing a measure of the distance travelled by each pair of pulses through the fuel, said signal generating means including a reference transceiver arranged to transmit pulses through the same liquid and over a known distance to a target and to receive pulses reflected from the target, to provide a reference distance and transit time, and said measuring means being responsive to said electrical signals received from the measuring and reference transceivers to provide output signals indicative of the change in position of the interface in the measurement/storage vessel during any of said predetermined time intervals.

8. The system defined in claim 7 further including two pulse transit time measuring modules connected respectively to said transducer means and to said signal generating means and arranged to receive signals therefrom, each module being arranged to receive and supply signals from and to respectively said control means, and valve means responsive to output signals from said control means to control the flow of fuel to and from said measurement/storage vessel.

9. The system claimed in claim 8 in which said control means is arranged to compute the volume of fuel discharged from the measurement/storage vessel during a fuel discharge operation in response to signals supplied thereto from said modules.

10. The system claimed in claim 9 further including a visual display device arranged to receive signals indicative of volume of fuel being discharged from the measurement/storage vessel, from said control means, to display the computed values of fuel volume discharged.

11. A liquid storage and measurement system including at least one liquid measurement/storage vessel of known dimensions arranged to be partially filled with liquid to an upper level to provide a liquid/gas interface, means for supplying liquid to said upper level, means for discharging liquid from the said at least one measurement/storage vessel, a measurement transducer associated with the or each measurement/storage vessel and arranged during continuous discharge of the liquid from the measurement/storage vessel, to transmit electrical pulses through the liquid in the said at least one measurement/storage vessel and to receive pulses reflected from the interface, during each of a plurality of predetermined time periods in order to produce electrical output signals indicative of the position of the interface during any said predetermined time period, a reference transducer arranged to transmit pulses through the same medium as the measurement transducer to a target positioned a precise known distance from the reference transducer which receives pulses reflected from said target, measuring means responsive to signals received from said measurement and reference transducers to provide an indication of the change in position of the interface in the said at least one measurement/storage vessel during continuous discharge of liquid therefrom and during successive said predetermined time periods and control means for applying data derived from said signals to an algorithm related to the known dimensions of the measurement vessel and the change in position of the interface to provide a volumetric indication of the liquid continuously discharged from the measurement/storage vessel during each said predetermined time period.

12. The system defined in claim 11 in which said measurement and reference transducers are each ultrasonic transceivers.

13. The system claimed in claim 11 including means for effecting excitation of the measurement transducer at a rate determined by said control means in accordance with the rate of change of liquid level in the measurement/storage vessel to produce output signals from said measurement transducer, a reference generator, voltage comparator means responsive to said signals from the measurement transducer and from the reference generator, and counting means responsive to signals from said comparator means to provide a count indicative of the total transit time for a pulse to be transmitted from said measurement transducer to the interface via the fluid and to be reflected back to said measurement transducer during each predetermined time period, and said count being supplied to said control means for providing said volumetric indication of the liquid discharged from the measurement/storage vessel.

14. The system claimed in claim 11 in which two pulse transit time measuring modules connected respectively to said transducer means and to said signal generating means and arranged to receive output signals therefrom, each module being arranged to receive and supply signals from and to respectively said control means, and valve means responsive to output signals from said control means to control the flow of liquid to and from said measurement/storage vessel.

15. The system claimed in claim 14 in which said control means is arranged to compute the volume of liquid discharge from the measurement/storage vessel during a liquid discharge operation in response to signals supplied thereto from said modules.

16. The system claimed in claim 15 further including a visual display device arranged to receive signals indicative of volume of liquid being discharged from the measurement vessel, from such control means, to display the computed values of liquid volume discharged.

* * * * *